(12) United States Patent
Costanzo et al.

(10) Patent No.: US 11,100,449 B1
(45) Date of Patent: Aug. 24, 2021

(54) SYSTEMS AND METHODS FOR EFFICIENCY MANAGEMENT

(71) Applicant: JPMorgan Chase Bank, N.A., New York, NY (US)

(72) Inventors: Peter G. Costanzo, Dublin, OH (US); Sergei Z. Maluszycki, Powell, OH (US); Pierre Bouchard, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1031 days.

(21) Appl. No.: 15/090,671

(22) Filed: Apr. 5, 2016

(51) Int. Cl.
*G06Q 10/00* (2012.01)
*G06Q 10/06* (2012.01)

(52) U.S. Cl.
CPC .............................. *G06Q 10/06393* (2013.01)

(58) Field of Classification Search
None
See application file for complete search history.

(56) References Cited

U.S. PATENT DOCUMENTS

| | | | | |
|---|---|---|---|---|
| 8,370,191 B2* | 2/2013 | Sankaran | ......... | G06Q 10/06398 705/7.33 |
| 2008/0229280 A1* | 9/2008 | Stienhans | ................. | G06F 8/34 717/107 |
| 2009/0125546 A1* | 5/2009 | Iborra | ................. | G06F 16/2365 |
| 2009/0132995 A1* | 5/2009 | Iborra | ................. | G06F 16/2365 717/106 |
| 2010/0305991 A1* | 12/2010 | Diao | ................... | G06Q 10/1097 705/7.21 |
| 2011/0047418 A1* | 2/2011 | Drees | ................... | H02J 13/0062 714/57 |
| 2011/0213631 A1* | 9/2011 | Mislavsky | ........... | G06Q 10/063 705/7.11 |
| 2011/0276908 A1* | 11/2011 | O'Riordan | ................ | G06F 8/34 715/763 |
| 2012/0246170 A1* | 9/2012 | Iantorno | .................... | G06F 8/77 707/748 |
| 2014/0297787 A1* | 10/2014 | Baugh | ..................... | H04L 67/34 709/217 |
| 2014/0344777 A1* | 11/2014 | Martin | ....................... | G06F 8/10 717/105 |
| 2015/0278336 A1* | 10/2015 | Wadhwani | ............ | G06F 16/284 707/748 |
| 2016/0034274 A1* | 2/2016 | Diao | ................... | G06Q 10/1097 717/103 |

(Continued)

OTHER PUBLICATIONS

Measures of Project Management Performance and Value, 2005, Center for Business Practices, p. 1-44.*

*Primary Examiner* — Joseph M Waesco

(74) *Attorney, Agent, or Firm* — Greenberg Traurig LLP

(57) ABSTRACT

Systems and methods for efficiency management are disclosed. In one embodiment, a method for efficiency management may include (1) receiving a complexity level for a project; (2) receiving, from a system of record, a plurality of data points for the project; (3) at least one computer processor calculating a plurality of metrics for the project from the plurality of data points; (4) the at least one computer processor normalizing the plurality of metrics based on the complexity level; and (5) the at least one computer processor displaying, using a plurality of widgets, the normalized metrics on a display.

18 Claims, 10 Drawing Sheets

(56) References Cited

U.S. PATENT DOCUMENTS

| | | | |
|---|---|---|---|
| 2016/0070547 A1* | 3/2016 | Ramanathan | G06F 8/36 |
| | | | 717/107 |
| 2016/0314417 A1* | 10/2016 | Jayaraman | G06Q 10/0635 |
| 2017/0083290 A1* | 3/2017 | Bharthulwar | G06F 11/3688 |
| 2017/0147485 A1* | 5/2017 | Jayaraman | G06F 11/3684 |

* cited by examiner

| Metrics | Formula/Definition/Notes | Multiplier |
|---|---|---|
| Weighted Story Points Delivered | • Measures the number of story points a Scrum Team completes compared to the minimum threshold (configurable)<br>• If Story Points completed is >= 192, then returns 0<br>• Calculated Daily – this will be a daily snapshot metric<br>• Sum of story points weighted by status for Story<br><br>| weights by status for actual work ||<br>| story status | % complete |<br>| New | 0% |<br>| READY FOR DEVELOPMENT | 10% |<br>| IN DEVELOPMENT | 40% |<br>| BLOCKED IN DEV | 40% |<br>| READY FOR QA | 50% |<br>| IN QA | 70% |<br>| BLOCKED IN QA | 70% |<br>| READY FOR SIGN OFF | 90% |<br>| Closed | 100% |<br><br>• If story point completed is <192 then:<br>• Daily Ideal Weighted SP delivery = 192 / 13 (for 3 week sprint, 13 business day to complete 192 SP)<br>• Weighted SP completed at give time = Sum of weighted story points by status as per above mapping table<br>• Delta (Daily Ideal – Daily Delivered) = ((Daily Ideal Weighted SP delivery) * No of business day completed in sprint excluding 1st 2 days) – Weighted SP completed at give time<br><br>Sample Data calculation: | -0.100 |
| Scope Change in % (story points) | • Records planned story points (Stories) from day 2<br>• Baseline Scope – Initial data to be collected on EOD Day 2 of Sprint<br>• Counting percent change – e.g. if the scrum team changed their scope after day 2 from 100 story points to 120 story points, the scope change is 20%. The count for that team will be 20.<br>• Percent change will be an absolute value – e.g. a scope decrease of 10% will be the same as a scope increase of 10%<br>• Baseline = Sum of Story Points after day 2 of start of Sprint<br>• Current SP = (Sum of Story Points at any given time)<br>• Scope Change = \|Baseline – Current SP\| / Baseline | -0.05 |
| Story points deferred | • Actual Story Points Completed = (Planned Story Points at the start of sprint) – (Story Points Delivered at end of sprint)<br>• Includes Stories<br>• End of sprint calculation: will only be counted at the end of sprint<br>• Planned Story Points to be collected on Day 2 Midnight PST (assuming Sprint starts on a Monday)<br><br>Story Points Delivered to be collected on Day 2 Midnight PST (assuming Sprint ends on the Friday before) | ? |

FIG. 3A

| Metric | Formula/Definition/Notes | Multiplier |
|---|---|---|
| Defects identified per story points | | |
| Critical | <ul><li>Critical severity defects identified in sprint</li><li>(Defect Count / Weighted Story Points) * 100</li><li>Includes Stories</li><li>Includes Sum of all Open AND Closed Stories</li><li>If there are no story points in the Sprint – metric will return "No Story Points Allocated"</li><li>Includes only defects created in the current Sprint assigned to any open sprint and backlog</li><li>Includes Open and Closed Defects</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" = Accessibility)</li></ul> | -0.960 |
| High | <ul><li>High severity identified in sprint</li><li>(Defect Count / Weighted Story Points) * 100</li><li>Includes Stories</li><li>Includes Sum of all Open AND Closed Stories-</li><li>If there are no story points in the Sprint – metric will return "No Story Points Allocated"</li><li>Includes only defects created in the current Sprint assigned to any open sprint and backlog</li><li>Includes Open and Closed Defects</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude "Defect Type" = Accessibility</li></ul> | -0.576 |
| Medium | <ul><li>Medium severity identified in sprint</li><li>(Defect Count / Weighted Story Points) * 100</li><li>Includes Stories</li><li>Includes Sum of all Open AND Closed Stories-</li><li>If there are no story points in the Sprint – metric will return "No Story Points Allocated"</li><li>Includes only defects created in the current Sprint assigned to any open sprint and backlog</li><li>Includes Open and Closed Defects</li><li>All defect metrics exclude defect type = automation framework, label = data_request, and status=rejected (except for Rejected Defect Count metric)</li><li>Exclude Regression Defects ("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.384 |

FIG. 3B

| Metrics | Formula/Definition/Notes | Multiplier |
|---|---|---|
| Low | <ul><li>Low severity identified in sprint</li><li>(Defect Count / Weighted Story Points) * 100</li><li>Includes Stories</li><li>Includes Sum of all Open AND Closed Stories-</li><li>If there are no story points in the Sprint – metric will return "No Story Points Allocated"</li><li>Includes only defects created in the current Sprint assigned to any open sprint and backlog</li><li>Includes Open and Closed Defects</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.192 |
| Aging for Open Defects Post SLA | | |
| Pending Defects older than 3 days | Displays average age of defects<ul><li>Includes defects created in the Sprint ONLY</li><li>Does not include Weekends</li><li>Defect Age for pending : (Current Day – (Create Date + 1 day)) – SLA</li><li>SLA Pending = 3 days</li><li>Excludes Weekends when calculating age</li><li>Includes only defects created in the current Sprint assigned to any open sprint and backlog</li><li>Age of defects starts count on the day after it is created, i.e. net work days – 1</li><li>All defect metrics exclude defect type = automation framework, label = data_request, and status=rejected (except for Rejected Defect Count metric)</li><li>Exclude Regression Defects ("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.01 |
| Critical Defects older than 2 days | Displays average age of defects<ul><li>Includes defects created in the Sprint ONLY</li><li>Does not include Weekends</li></ul>Defect Age for non-pending : (Current Day – (Date of first Prioritization + 1 day)) – SLA<ul><li>SLA C = 2 days</li><li>Excludes Weekends when calculating age</li><li>Includes only defects created in the current Sprint assigned to any open sprint and backlog</li><li>Age of defects starts count on the day after it is created, i.e. net work days – 1</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0500 |

FIG. 3C

| Metrics | Formula/Definition/Notes | Multiplier |
|---|---|---|
| High Defects older than 4 days | <ul><li>Displays average age of defects<ul><li>Includes defects created in the Sprint ONLY</li><li>Does not include Weekends</li></ul></li><li>Defect Age for non-pending : (Current Day − (Date of first Prioritization + 1 day)) − SLA<ul><li>SLA H = 4 days</li></ul></li><li>Excludes Weekends when calculating age</li><li>Includes only defects created in the current Sprint assigned to any open sprint and backlog</li><li>Age of defects starts count on the day after it is created, i.e. net work days − 1</li><li>All defect metrics exclude defect type = automation framework, label = data_request, and status=rejected (except for Rejected Defect Count metric)</li><li>Exclude Regression Defects ("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0450 |
| Medium Defects older than 15 days | <ul><li>Displays average age of defects<ul><li>Includes defects created in the Sprint ONLY</li><li>Does not include Weekends</li></ul></li><li>Defect Age for non-pending : (Current Day − (Date of first Prioritization + 1 day)) − SLA<ul><li>SLA M = 15 days</li></ul></li><li>Excludes Weekends when calculating age</li><li>Includes only defects created in the current Sprint assigned to any open sprint and backlog</li><li>Age of defects starts count on the day after it is created, i.e. net work days − 1</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0250 |
| Low Defect older than 15 days | <ul><li>Displays average age of defects<ul><li>Includes defects created in the Sprint ONLY</li><li>Does not include Weekends</li></ul></li><li>Defect Age for non-pending : (Current Day − (Date of first Prioritization + 1 day)) − SLA<ul><li>SLA L = 15 days</li></ul></li><li>Excludes Weekends when calculating age</li><li>Includes only defects created in the current Sprint assigned to any open sprint and backlog</li><li>Age of defects starts count on the day after it is created, i.e. net work days − 1</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0200 |
| Aging for Closed Defects post SLA | | |

FIG. 3D

| Metrics | Formula/Definition/Notes | Multiplier |
|---|---|---|
| Closed Pending Defects older than 3 days | • Displays average age of defects<br>　• Includes defects created in the Sprint ONLY<br>　• Does not include Weekends<br>　• Defects Age for pending : (Resolved Date – (Create Date + 1 day) - SLA<br>　　• SLA Pending = 3 days<br>• Excludes Weekends when calculating age<br>• Includes only defects created in the current Sprint assigned to any open sprint and backlog<br>• Age of defects starts count on the day after it is created, i.e. net work days - 1<br>• All defect metrics exclude defect type = automation framework, label = data_request, and status=rejected (except for Rejected Defect Count metric)<br>• Exclude Regression Defects (("Regression Defect" = EMPTY OR "Regression Defect" = No)<br>• Include defects with ("Owning Group" = scrum OR "Owning Group" = EMPTY)<br><br>• exclude Accessibility defects ("Defect Type" != Accessibility) | -0.01 |
| Closed Critical Defects older than 2 days | • Displays average age of defects<br>　• Includes defects created in the Sprint ONLY<br>　• Does not include Weekends<br>　• Defect Age for non-pending : (Resolved Date – (Date of first Prioritization + 1 day)) – SLA<br>　　• SLA C = 2 days<br>• Excludes Weekends when calculating age<br>• Includes only defects created in the current Sprint assigned to any open sprint and backlog<br>• Age of defects starts count on the day after it is created, i.e. net work days - 1<br>• All defect metrics exclude defect type = automation framework, label = data_request, and status=rejected (except for Rejected Defect Count metric)<br>• Exclude Regression Defects (("Regression Defect" = EMPTY OR "Regression Defect" = No)<br>• Include defects with ("Owning Group" = scrum OR "Owning Group" = EMPTY)<br><br>• exclude Accessibility defects ("Defect Type" != Accessibility) | -0.0500 |
| Closed High Defects older than 4 days | • Displays average age of defects<br>　• Includes defects created in the Sprint ONLY<br>　• Does not include Weekends<br>• Defect Age for non-pending : (Resolved Date – (Date of first Prioritization + 1 day)) – SLA<br>　• SLA H = 4 days<br><br>• Excludes Weekends when calculating age<br>• Includes only defects created in the current Sprint assigned to any open sprint and backlog<br>• Age of defects starts count on the day after it is created, i.e. net work days – 1<br>• All defect metrics exclude defect type = automation framework, label = data_request, and status=rejected (except for Rejected Defect Count metric)<br>• Exclude Regression Defects (("Regression Defect" = EMPTY OR "Regression Defect" = No)<br>• Include defects with ("Owning Group" = scrum OR "Owning Group" = EMPTY)<br><br>• exclude Accessibility defects ("Defect Type" != Accessibility) | -0.0450 |

FIG. 3E

| Metrics | Formula/Definition/Notes | Multiplier |
|---|---|---|
| Closed Medium Defects older than 15 days | <ul><li>Displays average age of defects<ul><li>Includes defects created in the Sprint ONLY</li><li>Does not include Weekends</li></ul></li><li>Defects Age for non-pending : (Resolved Date – (Date of first Prioritization + 1 day)) - SLA<ul><li>SLA M = 15 days</li></ul></li><li>Excludes Weekends when calculating age</li><li>Includes only defects created in the current Sprint assigned to any open sprint and backlog</li><li>Age of defects starts count on the day after it is created, i.e. net work days - 1</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0250 |
| Closed Low Defects older than 15 days | <ul><li>Displays average age of defects<ul><li>Includes defects created in the Sprint ONLY</li><li>Does not include Weekends</li></ul></li><li>Defect Age for non-pending : (Resolved Date – (Date of first Prioritization + 1 day)) – SLA<ul><li>SLA L = 15 days</li></ul></li><li>Excludes Weekends when calculating age</li><li>Includes only defects created in the current Sprint assigned to any open sprint and backlog</li><li>Age of defects starts count on the day after it is created, i.e. net work days - 1</li><li>All defect metrics exclude defect type = automation framework, label = data_request, and status=rejected (except for Rejected Defect Count metric)</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.0200 |
| Rejected Defect Count % | <ul><li>Rejected defects / total defects</li><li>Total defects includes rejected defects</li><li>Defects created in the current sprint</li><li>Each percentage point will count as 1, i.e. (1 rejected defect)/(100 total defects) = 1%, then this will equal to -1"1 = -1 count towards the Productivity Index score</li><li>Includes only defects created in the current Sprint assigned to any open sprint and backlog</li><li>Exclude Regression Defects (("Regression Defect" = EMPTY OR "Regression Defect" = No)</li><li>Include defects with ("Owning Group" = scrum OR "Owning Group" = EMPTY)</li><li>exclude Accessibility defects ("Defect Type" != Accessibility)</li></ul> | -0.05 |

FIG. 3F

| Metric | Formula/Definition/Notes | Multiplier |
|---|---|---|
| Any Individual Task estimated > 16 hours | <ul><li>Counts number of technical tasks with an estimate greater than 16 hours</li><li>Includes Only Technical Tasks assigned to the current sprint</li></ul> | -0.05 |
| Tasks not estimated in Current Sprint | <ul><li>Count number of technical tasks with Estimated hours = 0 or tasks with blank in estimated hours</li><li>Includes Only Technical Tasks assigned to the current sprint</li></ul> | -0.05 |
| Tasks in progress without effort logged | <ul><li>Count of tasks with logged hours = 0 or tasks with blank in logged hours</li><li>Includes Only Technical Tasks assigned to the current sprint</li><li>Status must be WIP</li></ul> | -0.05 |
| Open stories without points | <ul><li>Includes Stores in the Current Sprint</li><li>Excludes Stories in the "Closed" status</li><li>Count of Stories assigned to current sprint only</li><li>Story point filed should be empty or blank</li></ul> | -0.05 |
| Stories not linked to EPIC | <ul><li>Includes only Story issues types</li><li>Stories with no Epic linked to it</li><li>Includes all open/Closed stories from Current Sprints</li></ul> | -0.05 |
| Tasks Hours not tracking to optimal Burn down | <ul><li>Includes only "Technical Tasks"</li><li>PI Optimal burndown percent time remaining calculation should not include weekends</li><li>Total Estimated Hours (TEH)= ((Sum of total estimated hours for technical task)</li><li>Ideal Daily Burn down (IDBD) = TEH / Sprint business Days</li><li>Ideal Daily Burn down Point (IDBDP) = IDBD * Business Days Remaining in Sprint</li><li>Current burn down point (CBD) = (Sum of Remaining hours for technical Task)</li><li>unweighted result = CBD – IDBDP (0 if negative)</li><li>Weight = 0.05</li></ul> | -0.05 |
| Stories > 5 days old and not assigned to sprint (Invalid with current sprint data) | <ul><li>Includes Stories in the Current Sprint</li><li>Excludes Stories in the "Closed" status</li><li>Count of Stories</li><li>Age of Story does not include the day it was created</li><li>Only count if Story where sprint = empty</li></ul> | ? |
| Blocking Issues | <ul><li>Issues that are linked as "blocking" other issues</li></ul> e.g. Team 1 has issue A that is blocking Issue B and Issue C (can be from any team), this metric will count Team 1's Issue A as a blocking issue <ul><li>Exclude all issues with status Closed/Rejected/Done</li></ul> | ? |
| Stories without origin field value | <ul><li>Only Story issue type</li><li>Includes all stories from Current Sprints</li></ul> | ? |

FIG. 3G

SYSTEMS AND METHODS FOR EFFICIENCY MANAGEMENT

BACKGROUND OF THE INVENTION

1. Field of the Invention

The present invention generally relates to systems and methods for efficiency management.

2. Description of the Related Art

Large organizations often rely on different teams to perform tasks, such as writing software code. These tasks are often of varying complexities, and the teams often have different skill and experience levels.

SUMMARY OF THE INVENTION

Systems and methods for efficiency management are disclosed. In one embodiment, a method for efficiency management may include (1) receiving a complexity level for a project; (2) receiving, from a system of record, a plurality of data points for the project; (3) at least one computer processor calculating a plurality of metrics for the project from the plurality of data points; (4) the at least one computer processor normalizing the plurality of metrics based on the complexity level; and (5) the at least one computer processor displaying, using a plurality of widgets, the normalized metrics on a display.

In one embodiment, the step of receiving a complexity level for a project may include receiving a code component specification for the project; and the at least one computer processor determining the complexity level for the project based on the code component specification for the project.

In one embodiment, the code component specification may include a number of actions/commands, a number of data points, a number of content keys, a number of libraries, and/or historical data.

In one embodiment, the method may further include the at least one computer processor calculating a performance index based on the plurality of normalized metrics.

In one embodiment, the plurality of metrics may include a functional quality metric, a non-functional quality metric, a delivery metric, a process metric, and/or an output complexity metric.

In one embodiment, the method may further include weighting at least one of the plurality of metrics. The weighting may be based on at least one incentive, to emphasize a behavior, etc.

In one embodiment, the method may further include comparing the normalized metrics for the project to normalized metrics for a second project.

In one embodiment, a system for efficiency management may include a plurality of systems of record, each system of record associated with a project; a tool hosted by each system of record, the tool retrieving a plurality of data points related to the project for the system of record; a data loader in communication with each tool at each system of record and loading the data points retrieved by each tool into a computation module. The computation module may include at least one computer processor and, for each project associated with each of the plurality of systems of record, may receive a complexity level for the project; calculate a plurality of metrics for the project from the plurality of data points; normalize the plurality of metrics based on the complexity level; and display, using a plurality of widgets, the normalized metrics for at least one of the projects on a display.

In one embodiment, the complexity level for each project may be based on a code component specification for each project.

In one embodiment, the code component specification may include a number of actions/commands, a number of data points, a number of content keys, a number of libraries, and/or historical data.

In one embodiment, the computer processor may calculate a performance index based on the plurality of normalized metrics.

In one embodiment, the plurality of metrics may include a functional quality metric, a non-functional quality metric, a delivery metric, a process metric, and/or an output complexity metric.

In one embodiment, the computer processor may weigh at least one of the plurality of metrics. The weighting may be based on at least one incentive, to emphasize a behavior, etc.

In one embodiment, the computer processor may compare the normalized metrics for the project to normalized metrics for a second project.

BRIEF DESCRIPTION OF THE DRAWINGS

For a more complete understanding of the present invention, the objects and advantages thereof, reference is now made to the following descriptions taken in connection with the accompanying drawings in which:

FIGS. 3A-3G depict illustrative examples of metric calculations according to one embodiment.

DETAILED DESCRIPTION OF PREFERRED EMBODIMENTS

Several embodiments of the present invention and their advantages may be understood by referring to FIGS. 1-4.

The disclosure involves certain terms that are common to software development.

Embodiments disclosed herein relate to systems and methods for efficiency management. For example, embodiments are directed to functionality that captures real-time efficiency results of teams, team members, etc. In one embodiment, the teams/team members may be working on a scrum. The captured data may be normalized or otherwise adjusted to account for differing project complexities, hours worked, team member skill levels, etc. The results may be used to determine factors that impact team efficiency.

In one embodiment, the project complexity may be based on requirements for the project.

In another embodiment, the project complexity may be determined by referring to completed projects with similar requirements.

While this disclosure may be in the context of code writing, it is not so limited.

Figure 1:
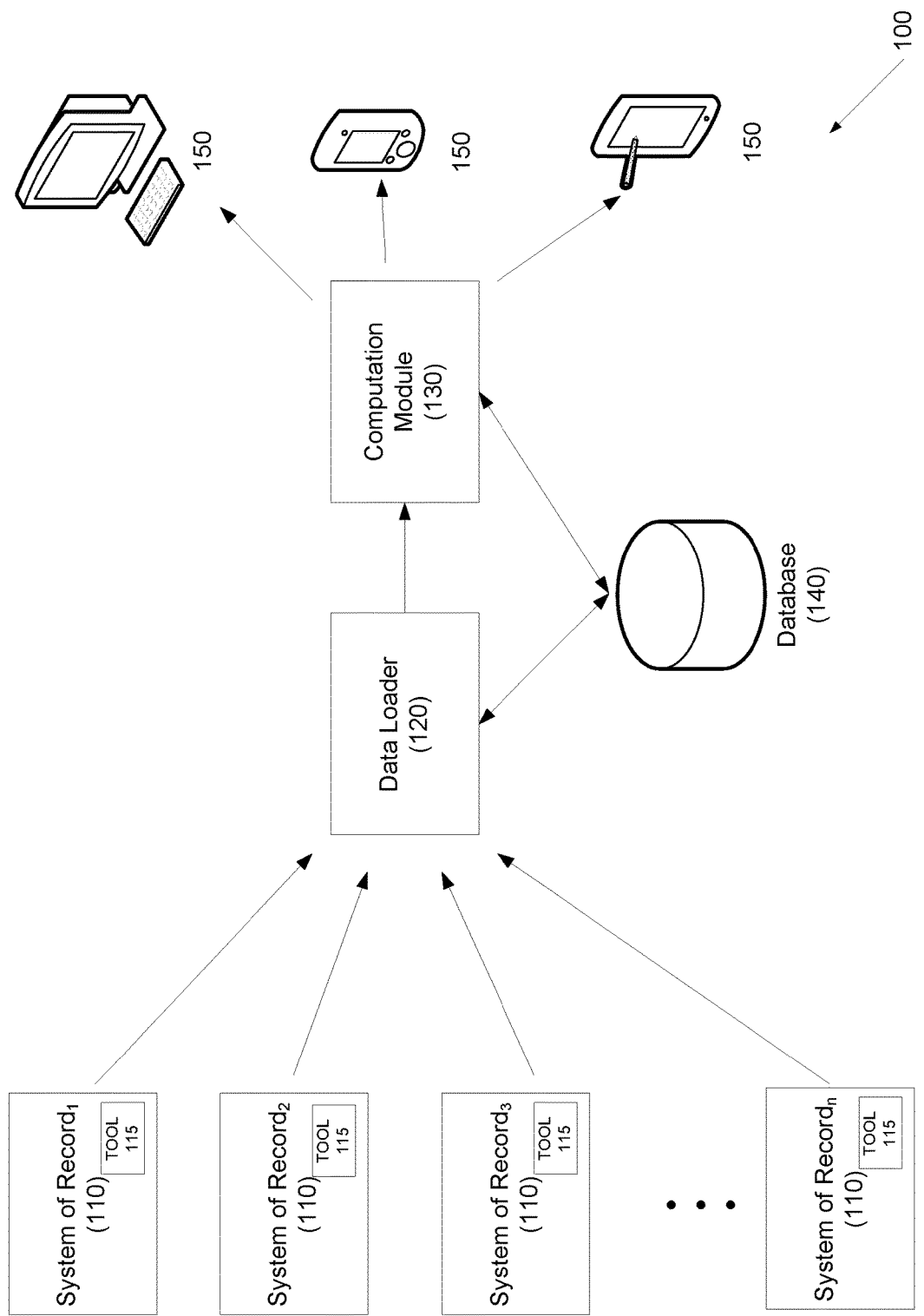
FIG. 1 depicts a system for efficiency management according to one embodiment.

Referring to FIG. 1, a block diagram of a system for efficiency management is disclosed according to one embodiment. System 100 may include one or more system of record 110, data loader 120, computation module 130, database 140, and access devices 150.

In one embodiment, system of record 110 may be used by an individual, or team, working on a project, a portion of a project, scrum, etc.

In one embodiment, each system of record 110 may be provided with one or more delivery execution/project management tool 115. Examples of tools 115 that may be used in the software coding environment include Atlassian's Jira, Hewlett-Packard's ALM, ThoughtWorks' Mingle, Apache Subversion, Software Freedom Conservancy's GIT, SonarSource S.A.'s SONAR, etc. The data from tools 115 may be provided to data loader 120.

In one embodiment, the data may be collected from one or more system of record 110 for an individual working of a project or a team of people working on a project, a portion of a project, scrum, etc.

Data loader component 120 may be a scheduled job that queries each system of record 110 for data. In one embodiment, data loader 120 may be hosted by a device that is separate from the systems of record 110. In another embodiment, each system of record 110 may host its own data loader component 110. In one embodiment, data loader component 120 may pull data from systems of record 110. In another embodiment, data may be pushed from systems of record 110 to data loader component.

In one embodiment, data loader component 120 may retrieve data related to, for example, quality, delivery, and process. The data may be stored in database 140, which may be any suitable storage.

Computation module 130 may receive data from data loader 120, or may retrieve stored data from database 140. In one embodiment, computation module 130 may be provided with additional data to determine complexity, including, for example semantic specifications (e.g., component specifications, controller specifications, metadata associated with each specification to estimate feature complexity); the number of components, events, services, etc.; data from the semantic specifications, associated metadata, additional data related to code; etc. For example, a component specification may define a "contract" between the business and presentation layers. It may serve as a skeleton for the site, where data, content, and interactions are defined using a common, shared vocabulary.

In one embodiment, computational module 130 may apply one or more algorithm to historical data to discovery relationships that allow the feature complexity to be estimated.

In one embodiment, computation module 130 may process the data to generate one or more performance metrics. Example metric categories include functional quality (e.g., defects per story points), non-functional quality (e.g., adherence to coding standards, usage of frameworks, adherence to organizational policies, etc.), delivery (e.g., weighted story points delivered), process (e.g., tasks not estimated in current sprint), and output complexity (e.g., complexity of code delivered in a sprint (e.g., a get-together of people involved in a project to further a focused development of the project) is measured using a component specification for functional features delivered Examples of metrics that may be determined include sprint ranking, internal quality measures, external quality measures, scrum performance metrics, component complexity measures, and embedded frameworks and application programmable interfaces (API) below analysis and computation.

Illustrative examples of metric calculations are provided in FIGS. 3A-3G. For example, FIG. 3A provides an example of delivery metrics and example weightings. FIGS. 3B-3F provide an example of quality metrics and example weightings. FIG. 3G provides an example of process metrics and example weightings.

The metrics may then be weighted and combined to generate a team level performance index. The weightings may be modified as necessary and/or desired. In one embodiment, the weightings may be modified to provide an incentive for a particular behavior.

In one embodiment, the modification of the weightings may be automated. For example, if a particular metric is lower than expected, the system may automatically recognize this and apply a weighting to one or more metrics that would be influenced by the incentivized activity. As another example, the results of one team's incentives may be applied to other teams.

In one embodiment, one or more of the metrics may be annotated with any team performance incentives in order to track the effectiveness of those incentives. The results may be provided in any suitable manner, including with a modifiable time-scale for performance over time.

Access devices 150 may display the results of computational module 130. Access devices 150 may include any suitable electronic device, including workstations, desktop computer, notebook computers, tablet computers, smart phones, etc.

In one embodiment, the output may be provided as discrete visual views across a variety of delivery and performance metrics. In one embodiment, performance views that compare participating teams may be provided.

In one embodiment, one or more widget may be used to display the data. In one embodiment, the quality widget may display a number of open defects, a net change in the number of open defects for a specific time period, an average age of defects, etc. It may further display defects by status, defects by priority, defect trends, average age priority-wise of defects, etc. Other data may be displayed as is necessary and/or desired.

In one embodiment, the process widget may display a "burn down" for the project, which may represent a completion percentage of the project based on an estimated number of hours required, a number of exceptions by task, story, etc. Any suitable gauge may be used to display the burn down.

In one embodiment, the delivery widget may display weighted story points for the project, which may be based on the project status (e.g., new, ready for development, in development, blocked in development, ready for quality assurance ("QA"), in QA, blocked in QA, ready for sign-off, and closed).

Figure 2:
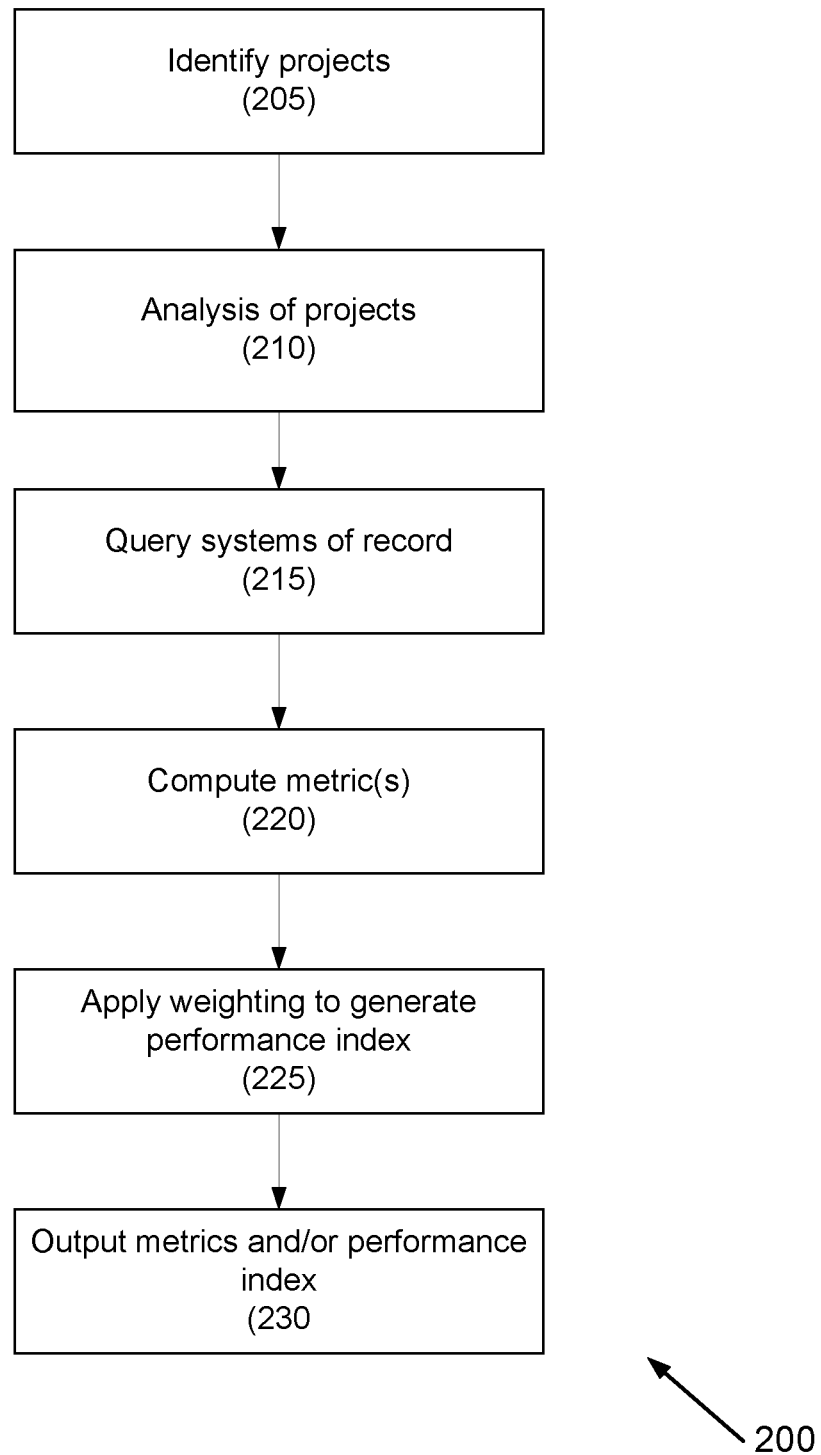
FIG. 2 depicts a method for efficiency management according to one embodiment.

Referring to FIG. 2, a method for efficiency management according to one embodiment is disclosed. In step 205, a project, or portion of a project, that is assigned to or associated with an individual or team is identified. In one embodiment, the project may be a coding project.

In one embodiment, if a standardized approach is used with tools such as JIRA, GIT, SVN, etc., work and/or deliveries may be associated to teams. If non-standard approaches are used, custom mappings may be used.

In step 210, the project or portion of the project may be analyzed to determine, for example, its complexity. For example, semantic specifications (e.g., component specifications, controller specifications, metadata associated with each specification to estimate feature complexity); the number of components, events, services, etc.; data from the semantic specifications, associated metadata, additional data related to code; etc. may be analyzed to determine the complexity of the code. The analysis may be automated, it may be done manually, or it may be done by a combination of the two. In one embodiment, the computational module 130 may apply algorithms to historical data to discovery relationships that allow the feature complexity to be estimated.

In one embodiment, the complexity of the code may be defined by the respective teams, by the project requirements, etc. as code component specifications. The code component specification may define the features of code at a technical level. Each code component specification may give an objective measure of the complexity of the code that will be written based on its properties and/or functionalities. For example, the following properties of code may be specified in the code component specifications: number of actions/commands, number of data points, the number of content keys, the number of libraries, historical data, etc. Other factors may be used as necessary and/or desired In one embodiment, each property/factor may be given an appropriate weighting as necessary and/or desired.

In one embodiment, the complexity may be used to better compare different individuals/teams that are working on different projects/portions of projects by normalizing and/or weighting the data.

In step 215, systems of record may be queried. In one embodiment, a data loader may be used to collect the data from the system of record.

In one embodiment, data may be queried from one or more delivery execution/project management tool, discussed above.

In one embodiment, push and/or pull models may be used to collect the data from the system of record. In one embodiment, raw data may be stored to allow to re-compute the index from past data when, for example, rules change.

In one embodiment, only changes in data may be retrieved/stored in lieu of storing a full data snapshot.

In one embodiment, to improve the performance of data calculations, certain parts may be precomputed and cached instead of making all calculations at one time.

Figure 4:
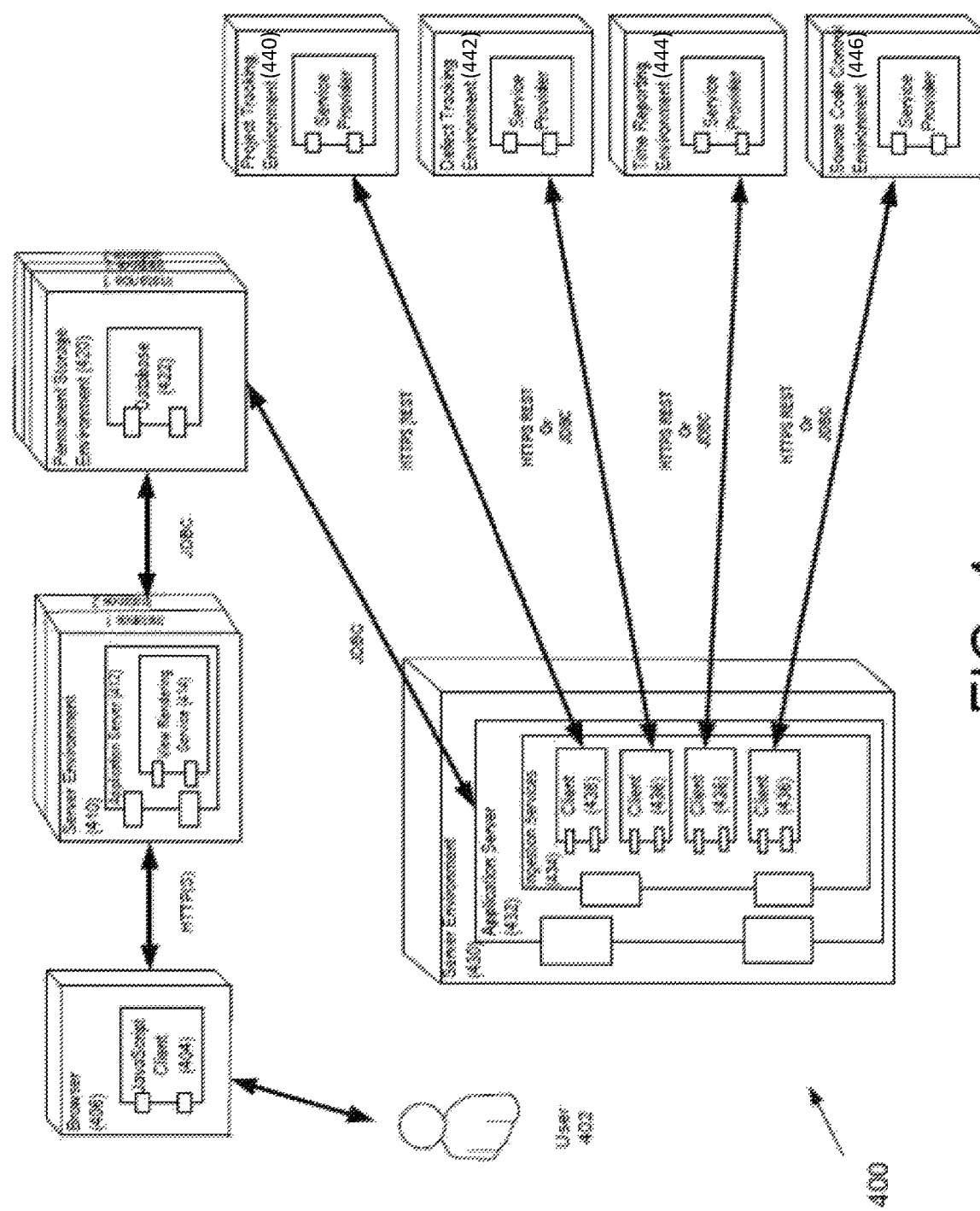
FIG. 4 depicts an exemplary architecture for efficiency management according to one embodiment.

An example system architecture 400 is provided in FIG. 4. In one embodiment, user 402 may access the system via JavaScript client 404 executed on browser 406. Browser 406 may communicate with one or more server environments 410, including one or more application servers 412 and one or more view rendering service 414. In one embodiment, view rendering services 414 may support user interactions.

Permanent Storage Environment 420 may include one or more database 422 that may provide application storage for data obtained from various systems of record. In one embodiment, calculations may be applied on raw data stored there before the view is presented to the user.

Server environment 430 may be provided, and may include application server 432, ingestion services 434, and one or more clients 436. In one embodiment, ingestion services 434 may provide an infrastructure having data loader resources deployed, which support pulling data from various systems of record, such as project tracking environment 440, defect tracking environment 442, time reporting environment 444, and source code control environment 446.

Referring again to FIG. 2, in step 220, based on the data, one or more metric may be calculated. In one embodiment, one or more of a functional quality, non-functional quality metric, delivery metric, process metric and output complexity metric may be calculated. Any other suitable metric may be calculated as is necessary and/or desired.

In step 225, the metrics may be weighted to generate a performance metric index for the individual, team, etc. In one embodiment, this weighting may normalize the metrics across different teams and/or individuals.

Examples of ways in which individual metrics may be combined into a common index are disclosed in the "Handbook on Constructing Composite Indicators: Methodology and Users Guide" (2008), available from the Organisation For Economic Co-Operation And Development, the disclosure of which is hereby incorporated by reference in its entirety.

In step 230, the metrics and/or performance metric index may be output. In one embodiment, the results may be annotated with any team performance incentives in order to track the effectiveness of those incentives. The results may be provided in any suitable manner, including with a modifiable time-scale for performance over time.

In one embodiment, one or more widget may be used to display the data, as described above.

In one embodiment, the system may incentivize certain behavior by automatically adjusting the weightings of one or more metric. For example, if one team responds well to an incentive for a particular behavior (e.g., their performance index increases), then that incentive may be applied to other teams by adjusting the weighting of one or more metric. As another example, if one behavior is being emphasized (e.g., code performance tuning, cyber security, etc.), the associated metric(s) may be weighted appropriately to incentivize this behavior.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by an individual or individuals of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for efficiency management, comprising:
   at least one computer processor determining a complexity level for a coding project based on a code component specification for the coding project;
   ingesting, from a plurality of data loaders, each data loader associated with one of a plurality of systems of record used by the coding project, project tracking data, defect tracking data, time tracking data, and source code control data inserted by a JavaScript client for the coding project over a computer network using Java Database Connectivity (JDBC) or HTTPS REST;
   the at least one computer processor calculating a plurality of metrics for the coding project from the project tracking data, the defect tracking data, the time data, and the source code control data, the metrics comprising a functional quality metric, a non-functional quality metric, a delivery metric, a process metric, and an output complexity metric;
   the at least one computer processor normalizing the plurality of metrics based on the complexity level;
   the at least one computer processor applying a weighting to at least one of the metrics to generate a performance metric index for a project team;
   the at least one computer processor outputting, in a graphical user interface on a display, a graphical representation of the performance metric index for the project team in a performance metric index widget; and
   the at least one computer processor outputting, in the graphical user interface on the display, a graphical representation of a burn down for the project as a gauge in a second widget, the burndown representing a completion percentage of the coding project.

2. The method of claim 1, wherein the step of receiving a complexity level for a coding project comprises:
   the at least one computer processor receiving a code component specification for the coding project; and
   the at least one computer processor determining the complexity level for the coding project based on the code component specification for the coding project.

3. The method of claim 2, wherein the code component specification comprises a number of actions/commands, a number of data points, a number of content keys, a number of libraries, and historical data.

4. The method of claim 1, wherein the weighting is based on at least one incentive.

5. The method of claim 1, wherein the weighting is based to emphasize a behavior.

6. The method of claim 1, further comprising:
   the at least one computer processor comparing the normalized metrics for the coding project to normalized metrics for a second coding project.

7. The system of claim 1, wherein the computation module further: compares the normalized metrics for each coding project.

8. The method of claim 1, further comprising:
   comparing the performance metric index for the project team to a project metric index for a second project team; and
   adjusting the weighting based on the comparison.

9. The method of claim 1, further comprising:
   receiving, from the systems of record, a second set of project tracking data, the defect tracking data, the time data, and the source code control data for the coding project;
   comparing the second set of project tracking data, the defect tracking data, the time data, and the source code control data project tracking data, the defect tracking data, the time data, and the source code control data;
   adjusting the weighting based on the comparison.

10. The method of claim 1, wherein the complexity level for the coding project is determined from historical project data.

11. A system for efficiency management, comprising:
    a plurality of systems of record comprising:
      a project tracking system of record storing project tracking data for a coding project;
      a defect tracking system of record storing defect tracking data for the coding project;
      a time reporting system of record storing time data for the coding project; and
      a source code control system of record storing source code control data for the coding project;

a tool hosted by each system of record;

a data loader in communication with each tool at each system of record;

the computation module comprising at least one computer processor and, for each coding project associated with each of the plurality of systems of record:

determines a complexity level for a coding project based on a code component specification for the coding project;

ingests the project tracking data, the defect tracking data, the time data, and the source code control data inserted by a JavaScript client from the data loader for the appropriate system of record over a computer network using Java Database Connectivity (JDBC) or HTTPS REST;

calculates a plurality of metrics for the coding project from the project tracking data, the defect tracking data, the time data, and the source code control data, the metrics comprising a functional quality metric, a non-functional quality metric, a delivery metric, a process metric, and an output complexity metric;

normalizes the plurality of metrics based on the complexity level;

applies a weighting to at least one of the metrics to generate a performance metric index for a project team; and outputs, in a graphical user interface on a display, a graphical representation of the performance metric index for the project team in a performance metric index widget.

12. The system of claim 11, wherein complexity level for each coding project is determined by:

receives a code component specification for each coding project; and determines the complexity level for each coding project based on the code component specification for the coding project.

13. The system of claim 12, wherein the code component specification comprises a number of actions/commands, a number of data points, a number of content keys, a number of libraries, and historical data.

14. The system of claim 11, wherein the weighting is based on at least one incentive.

15. The system of claim 11, wherein the weighting is based to emphasize a behavior.

16. The system of claim 11, wherein the computation module further:

compares the performance metric index for the project team to a project metric index for a second project team; and adjusts the weighting based on the comparison.

17. The system of claim 11, wherein the computation module further:

receives, from the systems of record, a second set of project tracking data, the defect tracking data, the time data, and the source code control data for the coding project;

compares the second set of project tracking data, the defect tracking data, the time data, and the source code control data to the project tracking data, the defect tracking data, the time data, and the source code control data;

adjusts the weighting based on the comparison.

18. The system of claim 11, wherein the complexity level for the coding project is determined from historical project data.

* * * * *